United States Patent
Phan Huy et al.

(10) Patent No.: US 8,867,413 B2
(45) Date of Patent: Oct. 21, 2014

(54) METHOD OF PRE-EQUALIZATION BY TIME REVERSAL IN FDD

(75) Inventors: Dinh Thuy Phan Huy, Paris (FR); Jean-Marie Chaufray, Chatenay Malabry (FR)

(73) Assignee: France Telecom, Paris (FR)

( * ) Notice: Subject to any disclaimer, the term of this patent is extended or adjusted under 35 U.S.C. 154(b) by 430 days.

(21) Appl. No.: 13/318,286

(22) PCT Filed: Apr. 30, 2010

(86) PCT No.: PCT/FR2010/050825
§ 371 (c)(1),
(2), (4) Date: Dec. 21, 2011

(87) PCT Pub. No.: WO2010/128234
PCT Pub. Date: Nov. 11, 2010

(65) Prior Publication Data
US 2012/0099493 A1    Apr. 26, 2012

(30) Foreign Application Priority Data
May 7, 2009  (FR) ...................................... 09 53062

(51) Int. Cl.
*H04B 7/005*   (2006.01)
*H04L 5/14*    (2006.01)
*H04L 25/02*   (2006.01)
*H04L 25/03*   (2006.01)

(52) U.S. Cl.
CPC .............. *H04L 5/14* (2013.01); *H04L 25/0228* (2013.01); *H04L 25/0204* (2013.01); *H04L 25/03114* (2013.01); *H04L 2025/03426* (2013.01); *H04L 2025/03611* (2013.01); *H04L 25/03343* (2013.01); *H04L 25/0212* (2013.01); *H04L 2025/03802* (2013.01)
USPC ............. 370/278; 455/63.1; 455/68; 375/231

(58) Field of Classification Search
None
See application file for complete search history.

(56) References Cited

U.S. PATENT DOCUMENTS 6,285,859 B1    9/2001  Fernandez Duran et al. ... 455/63
7,197,084 B2 *  3/2007  Ketchum et al. .............. 375/296
(Continued)

FOREIGN PATENT DOCUMENTS

EP    0936781         8/1999
WO    2007103085      9/2007

OTHER PUBLICATIONS

English Translation of the Written Opinion dated Nov. 4, 2010 for corresponding International Application No. PCT/FR2010/050826, filed Apr. 30, 2010.

(Continued)

*Primary Examiner* — Brian Roberts
(74) *Attorney, Agent, or Firm* — David D. Brush; Westman, Champlin & Koehler, P.A.

(57) ABSTRACT

A method of pre-equalizing a data signal transmitted in frequency division duplex includes receiving via an originating reference antenna a first pilot sequence transmitted by a destination antenna through a first channel, and estimating a first impulse response of the first channel; receiving via a destination antenna a second pilot sequence transmitted by an originating antenna through a second channel, and estimating a second impulse response of the second channel; receiving, via the reference antenna, a third pilot sequence modulated by the second impulse response and transmitted by the destination antenna, and estimating a combined impulse response of the first and second channels in succession; time reversing the combined impulse response; combining the time-reversed combined impulse response and the first impulse response; re-iterating the steps for a portion of the destination and originating antennas; and determining pre-equalization coefficients for the data signal from a set of the impulse response combinations.

10 Claims, 3 Drawing Sheets

(56) References Cited

U.S. PATENT DOCUMENTS

| | | | | |
|---|---|---|---|---|
| 7,738,593 | B2* | 6/2010 | Howard | 375/296 |
| 2003/0138053 | A1* | 7/2003 | Candy et al. | 375/259 |
| 2005/0141459 | A1 | 6/2005 | Li et al. | 370/334 |
| 2006/0098746 | A1* | 5/2006 | Candy et al. | 375/259 |
| 2007/0099571 | A1 | 5/2007 | Withers, Jr. et al. | 455/67.11 |
| 2007/0206504 | A1 | 9/2007 | Koo et al. | 370/245 |
| 2010/0197264 | A1* | 8/2010 | Azadet et al. | 455/272 |

OTHER PUBLICATIONS

English Translation of the International Preliminary Report on Patentability and Written Opinion dated Nov. 9, 2011 for corresponding International Application No. PCT/FR2010/050825, filed Apr. 30, 2010.

International Search Report and Written Opinion dated Jul. 27, 2010 for corresponding International Application No. PCT/FR2010/050825, filed Apr. 30, 2010.

International Search Report and Written Opinion dated Nov. 4, 2010 for corresponding International Application No. PCT/FR2010/050826, filed Apr. 30, 2010.

Tourin A. et al., "Time Reversal Telecommunications in Complex Environments" Comptes Rendus—Physique, Elsevier, Paris, FR, vol. 7, No. 7, Sep. 1, 2006, pp. 816-822, XP024978786.

Robert C. Qui Ed—Anonymous: "A Theory of Time-Reversed Impulse Multiple-Input Multiple-Output (MIMO) for Ultra-Wideband (UWB) Communications" Ultra-Wideband, The 2006 IEEE 2006 International Conference in, IEEE, PI, Sep. 1, 2006, pp. 587-592, XP031007200.

Dahl T. et al., "Blind Beamforming in Frequency Division Duplex MISO Systems Based on Time Reversal Mirrors" Signal Processing Advances in Wireless Communications, 2005 IEEE $6^{th}$ Workshop on New York, NY, USA Jun. 2-8, 2005, Piscataway, NJ, USA, IEEE, Jun. 2, 2005, pp. 640-644, XP010834538.

Gomes J. et al., "Time-Reversed OFDM Communication in Underwater Channels" Signal Processing Advances in Wireless Communications, 2004 IEEE $5^{th}$ Workshop in Lisbon, Portugal Jul. 11-14, 2004, Piscataway, NJ, USA, IEEE, Jul. 11, 2004, pp. 626-630, XP010805978.

Patrice Pajusco et al., "Characterization of UWB Time Reversal Using Circular Array Measurements" wireless Technologies, 2007 European Conference in, IEEE, PI, Oct. 1, 2007, pp. 102-105, XP031190917.

Gesbert et al., "From Theory to Practice: An Overview of MMO Space-Time Coded Wireless Systems" IEEE Journal on Selected Areas in Communications, vol. 21, No. 3, Apr. 2003.

Alamouti, "A Simple Transmit Diversity Technique for Wireless Communications" IEEE Journal on Select Areas in Communications, vol. 16, No. 8, Oct. 1998.

* cited by examiner

METHOD OF PRE-EQUALIZATION BY TIME REVERSAL IN FDD

CROSS-REFERENCE TO RELATED APPLICATIONS

This Application is a Section 371 National Stage Application of International Application No. PCT/FR2010/050825, filed Apr. 30, 2010 and published as WO 2010/128234 on Nov. 11, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to a method of pre-equalizing a data signal, e.g. transmitted in a radio communications network based on frequency division duplex (FDD).

In an FDD type network, two communicating entities transmit data signals in distinct frequency bands. By way of example, the communicating entities are radio terminals, terrestrial base stations, satellite base stations, or indeed radio access points. The disclosure relates to radio communications networks of the single input single output (SISO) type for which the communicating entities have a single antenna, to multiple input multiple output (MIMO) type networks for which each of the communicating entities has a plurality of antennas, and networks that combine communicating entities having one antenna with communicating entities having a plurality of antennas of the single input multiple output (SIMO) type or the multiple input single output (MISO) type.

BACKGROUND OF THE DISCLOSURE

A radio signal transmitted by an antenna of a communicating entity, referred to as an antenna signal, is subjected to deformation as a function of propagation conditions between a point of origin defined at the outlet of the originating antenna and a destination point defined at the inlet of an antenna of the destination communicating entity. In order to limit such deformation, the antenna signal is previously distorted by applying pre-equalization coefficients as a function of the characteristics of the propagation channel between the two antennas. It is therefore necessary to characterize the propagation channel.

Amongst existing pre-equalization methods, there are methods that are based on time reversal that are distinguished by their low complexity and their high performance.

Time reversal is a technique for focusing waves, typically soundwaves, and it relies on the invariance of the wave equation to time reversal. Thus, a wave that is reversed in time propagates like a forward wave going backwards in time.

A short pulse transmitted from a point of origin propagates through a propagation medium. A portion of this wave as received by a destination point is time reversed before being returned into the propagation medium. The wave converges towards the point of origin where it re-forms a short pulse. The signal picked up at the point of origin is practically identical in terms of form to the originating signal transmitted from the point of origin. In particular, the time-reversed wave converges with accuracy that increases with increasing complexity of the propagation medium. The time reversal of the propagation channel as applied to the wave enables energy to be concentrated and cancels out the effect of the channel on a focal point when the wave as pre-distorted in this way is transmitted from the point of origin.

The time-reversal technique is thus applied to radio communications networks in order to cancel out the effect of the propagation channel on the antenna signal at a focal point, in particular by reducing the spreading of the channel by concentrating energy on the focal point, thereby simplifying the processing of symbols that are received after passing through the channel. The antenna signal transmitted by an antenna of the originating communicating entity is thus pre-equalized by applying coefficients obtained by time reversal of the impulse response of the propagation channel through which the antenna signal is to pass. Implementing time reversal thus requires the originating communicating entity to have knowledge about the propagation channel in the frequency band that is dedicated to communication coming from that entity.

However, when using transmission in FDD mode, transmission from a communicating entity referred to as an originating communicating entity to a destination communicating entity, and transmission in the opposite direction take place in distinct frequency bands. For example, in a radio communications system, this involves transmission in a first frequency band from a mobile radio terminal to a base station, said to be transmission in the "up" direction, and transmission in a second frequency and from a base station to a mobile radio terminal, said to be transmission in the "down" direction. Although a communicating entity can estimate a propagation channel on the basis of receiving a signal that has passed through the channel, it cannot estimate a propagation channel on the basis of a signal that has been transmitted in a different frequency band. It is therefore particularly advantageous to have a technique for pre-equalizing antenna signals for this type of transmission.

A first solution is proposed in the article entitled "From theory to practice: an overview of MIMO space-time coded wireless systems" by David Gesbert, Mansoor Shafi, Da-Shan Shiu, Peter J. Smith, and Aymon Naguib, and published in IEEE Journal on Selected Areas in Communication, Vol. 21, No. 3, in April 2003. The method proposed relies on time reversal as a pre-equalization technique in which the coefficients are evaluated from an estimate of the propagation channel performed by the destination communicating entity. The estimation is performed by the destination communicating entity on the basis of knowledge of pilots previously transmitted by the originating communicating entity. A quantification of the estimate of the propagation channel is then delivered to the originating communicating entity. Nevertheless, the quantification of the estimate of the propagation channel needs to be sufficiently accurate in order to guarantee that pre-equalization is effective. Furthermore, the radio resources needed for delivering the quantified estimate of the propagation channel increase with increasing accuracy of the quantification.

A compromise therefore needs to be reached between the accuracy of the quantification of the estimate of the propagation channel and the consumption of radio resources used for transmitting the quantified estimate of the propagation channel.

SUMMARY

An embodiment of the invention proposes an alternative solution that offers a method of pre-equalization that is based on time reversal without requiring the destination communicating entity to deliver a quantified estimate of a propagation channel. This solution is also suitable for communicating entities having only one antenna in which the data signal comprises a single antenna signal, or for communicating entities having a plurality of antennas, in which a data signal is made up of a plurality of antenna signals.

An embodiment of the invention provides a method of pre-equalizing a data signal transmitted in frequency division duplex by an originating communicating entity having a set of originating antennas to a destination communicating entity having a set of destination antennas. The method comprises the steps of:
- receiving via a reference antenna of the set of originating antennas a first pilot sequence transmitted by a destination antenna through a first propagation channel, and estimating a first impulse response representative of said first propagation channel;
- receiving via the destination antenna a second pilot sequence transmitted by an originating antenna through a second propagation channel between said originating antenna and the destination antenna, and estimating a second impulse response representative of said second propagation channel;
- receiving, via the reference antenna, a third pilot sequence that is modulated by said second impulse response and transmitted by the destination antenna, and estimating a combined impulse response representative of said first and second propagation channels in succession;
- time reversing the combined impulse response;
- combining the time-reversed combined impulse response and the first impulse response;
- said steps being re-iterated for at least a portion of the set of destination antennas and at least a portion of the set of originating antennas; and
- determining pre-equalization coefficients for the data signal from a set of said impulse response combinations.

This method thus makes it possible to avoid using radio resource for transmitting an estimate of the propagation channel. Furthermore, no quantification is needed, thus making it possible to guarantee that pre-equalization is effective. The destination communicating entity releases the resources that were previously used for delivering the estimate(s) of the propagation channel without requiring complex analog or digital processing.

In the originating communicating entity, the complexity of the method of an embodiment of the invention for pre-equalizing a data signal is thus limited to transmitting and receiving pilot signals and estimating propagation channels. In addition, in the destination communicating entity, the complexity of the method of pre-equalizing a data signal transmitted by the originating communicating entity is limited to generating pilot signals and to estimating an impulse response.

The pre-equalization coefficients are determined so as to concentrate the energy of the signal on the focal point by applying time reversal, thereby reducing the spreading of the propagation channel through which the signal passes. The coefficients are obtained directly from a combination of a set of composite impulse responses.

Furthermore, the method is independent of the various pre-coding and modulation methods that are applied to binary data for generating a data signal having a plurality of antenna signals.

In addition, an embodiment of the invention applies equally well to SISO type radio communications networks in which the communicating entities have only one antenna, MIMO type networks in which the communicating entities have a plurality of antennas, and networks combining communicating entities having only one antenna with communicating entities having a plurality of antennas of the SIMO or MISO types.

The method of an embodiment of the invention further includes, in the step of receiving the first pilot sequence transmitted by the destination antenna, selecting the reference antenna as a function of a set of pilot signals received by the set of originating antennas.

This selection thus makes it possible to select the first propagation channel as a function of characteristics of the received pilot signals, e.g. their spread in signal time.

In a particular embodiment, the reference antenna is selected as a function of the energies of the pilot signals in the set of pilot signals received via the set of originating antennas.

This selection thus serves to give priority to the first propagation channel in which signal energy is attenuated the least.

The invention also provides a device for pre-equalizing a data signal transmitted in frequency division duplex for a communicating entity referred to as an originating communicating entity having a set of originating antennas, said originating communicating entity being suitable for transmitting said signal to a destination communicating entity having a set of destination antennas. The device comprising means for:
- receiving via a reference antenna of the set of originating antennas, a first pilot signal transmitted by a destination antenna through a first propagation channel, and estimating a first impulse response representative of the first propagation channel;
- transmitting via an originating antenna, a second pilot sequence through a second propagation channel between the originating antenna and the destination antenna;
- receiving via the reference antenna, a modulated third pilot sequence, and estimating a combined impulse response representative of the first and second propagation channels in succession;
- time reversing the combined impulse response;
- combining the combined and time-reverse impulse response with the first impulse response; and
- determining pre-equalization coefficients for the data signal from a set of impulse response combinations;

the means for receiving, time reversing, and combining being implemented iteratively for at least a portion of the set of destination antennas and at least a portion of the set of originating antennas.

An embodiment of the invention also provides a device for pre-equalizing a data signal transmitted in frequency division duplex for a destination communicating entity, and having a set of destination antennas, the destination communicating entity being suitable for receiving the data signal transmitted by an originating communicating entity including a device as described above, the originating communicating entity having a set of originating antennas. The device comprises means for:
- transmitting a first pilot sequence via a destination antenna to the originating communicating entity;
- receiving a second pilot sequence transmitted by an originating antenna, and estimating an impulse response; and
- transmitting a third pilot sequence modulated by said estimated impulse response;

the means for transmitting and receiving being implemented iteratively for at least a portion of the set of destination antennas and at least a portion of the set of originating antennas.

An embodiment of the invention also provides a communicating entity of a radio communications system including at least one of the above-specified devices for pre-equalizing a data signal.

An embodiment of the invention also provides a radio communications system comprising at least one originating communicating entity and at least one destination communicating entity of an embodiment of the invention.

An embodiment of the invention also provides a computer program for a communicating entity, referred to as an originating communicating entity, the program including software instructions for controlling the implementation by the entity of those steps of the method of an embodiment of the invention that are implemented by the originating communicating entity when the program is executed by the originating communicating entity.

An embodiment of the invention also provides a computer program for a communicating entity, referred to as a destination communicating entity, the program including software instructions for controlling the implementation by said entity of those steps of the method of an embodiment of the invention that are implemented by the destination communicating entity when the program is executed by the destination communicating entity.

The devices, communicating entities, system, and computer programs present advantages analogous to those set out above.

BRIEF DESCRIPTION OF THE DRAWINGS

Other characteristics and advantages appear more clearly on reading the following description of particular implementations of the method of pre-equalizing a data signal and of associated communicating entities, given merely as non-limiting and illustrative examples, and with reference to the accompanying drawings, in which.

DETAILED DESCRIPTION OF ILLUSTRATIVE EMBODIMENTS

Figure 1:
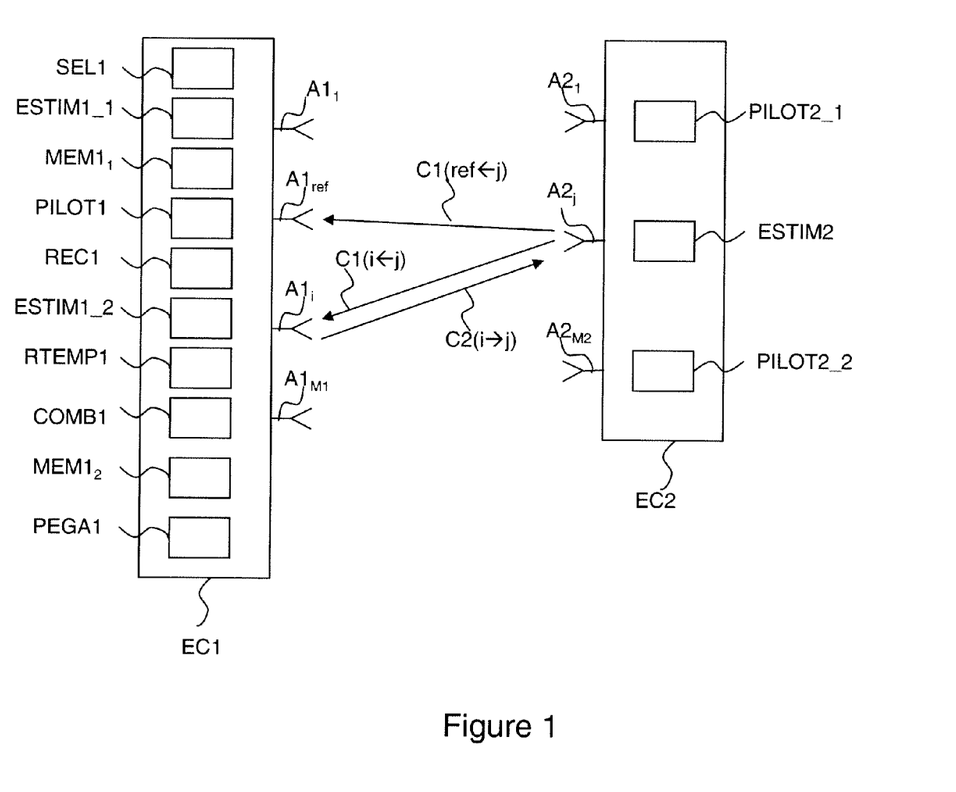
FIG. 1 is a diagrammatic block diagram of an originating communicating entity communicating with a destination communicating entity of an embodiment of the invention.

With reference to FIG. 1, an originating communicating entity EC1 is suitable for communicating with a destination entity EC2 via a radio communications network based on frequency division duplex (FDD), not shown in the figure. For example, the radio communications network is a cellular radio communications network of the universal mobile communications system (UMTS) type as defined by the 3rd generation partnership project (3GPP) specification organization and its evolutions including 3GPP-LTE (for "long term evolution").

The communicating entities may be mobile terminals or indeed terrestrial or satellite base stations, or indeed access points. In FDD mode, transmission from a base station to a mobile radio terminal in the so-called "down" channel takes place in a frequency band that is distinct from the frequency band dedicated to transmission from a mobile radio terminal to a base station in the so-called "up" channel. For reasons of clarity, an embodiment of the invention is described for unidirectional transmission of a data signal from the communicating entity EC1 to the communicating entity EC2, regardless of whether this is in the up direction or the down direction. An embodiment of the invention also relates to bidirectional transmission.

The originating communicating entity EC1 has M1 originating antennas ($A1_1, \ldots, A1_{ref}, \ldots, A1_i, \ldots, A1_{M1}$), where M1 is greater than or equal to 1. The destination communicating entity has M2 destination antennas ($A2_1, \ldots, A2_j, \ldots, A2_{M2}$) where M2 is greater than or equal to 1.

The destination communicating entity EC2 is suitable for transmitting a pilot sequence or a radio signal from at least any one of the antennas $A2_j$, where j ranges from 1 to M2, in a first frequency band. A first propagation channel C1 (i←j) is defined between the antenna $A2_j$ of the destination communicating entity EC2 and an antenna $A1_i$ of the originating communicating entity EC1. Similarly, a first propagation channel C1(ref←j) is defined between the destination antenna $A2_j$ and the originating antenna $A1_{ref}$. M1×M2 first propagation channels (C1(i←j) for i varying from 1 to M1 and j varying from 1 to M2, are thus defined between the communicating entities EC1 and EC2.

The originating communicating entity EC1 is suitable for transmitting a pilot sequence or a radio signal from at least any one of the antennas $A1_i$, for i varying from 1 to M1, to the destination communicating entity EC2 in a second frequency band distinct from the first. A second propagation channel C2(i→j) is defined between the antenna $A1_i$ of the originating communicating entity EC1 and an antenna $A2_j$ of the destination communicating entity EC2 for transmission from the communicating entity EC1 to the communicating entity EC2. M1×M2 second propagation channels C2(i→j) for i varying from 1 to M1 and j varying from 1 to M2 are thus defined between the communicating entities EC1 and EC2.

In FIG. 1, there are shown only those means that are associated with an embodiment of the invention and that are included in the originating communicating entity or in the destination communicating entity.

The originating and destination communicating entities also include respective central control units (not shown), to which the means shown are connected and which serve to control the operation of said means.

The originating communicating entity also includes a data signal generator having M1 antenna signals. Such antenna signals are defined from binary data by methods of modulation, coding, and sharing over the M1 antennas, e.g. as described in the article "Space block coding: a simple transmitter diversity technique for wireless communications", published in the IEEE Journal on Selected Areas in Communications, Vol. 16, pp. 1456-1458, October 1998, by S. Alamouti.

The originating communicating entity EC1 comprises:
a selective receiver SEL1 arranged to receive from the set of originating antennas a first pilot sequence transmitted by the destination communicating entity EC2 and to select a reference antenna from the set of originating antennas;
a channel estimator ESTIM1_1 arranged to estimate a first impulse response from the first pilot sequence transmitted by the destination entity and received by the reference antenna;
a memory $MEM1_1$ storing the first impulse response, or the corresponding transfer function, as determined by the channel estimator ESTIM1_1;
a pilot sequence generator PILOT1 arranged to transmit a second pilot sequence from any one of the antennas $A1_i$ for i varying from 1 to M1 on a carrier frequency f1 of the frequency band dedicated to transmission from the communicating entity EC1 to the communicating entity EC2;

a receiver REC1 arranged to receive via the selected reference antenna a modulated third pilot sequence transmitted by the destination entity;

a channel estimator ESTIM1_2 arranged to estimate a combined impulse response from the modulated third pilot sequence transmitted by the destination entity and received by the reference antenna;

an impulse analyzer RTEMP1 arranged to time reverse the combined impulse response delivered by the channel estimator ESTIM1_2;

a calculator COMB1 arranged to combine a first impulse response stored in the memory $MEM1_1$ with a time-reversed combined response delivered by the impulse analyzer RTEMP1;

a memory $MEM1_2$ storing impulse responses, or corresponding transfer functions, as determined iteratively by the calculator COMB1; and a pre-equalizer PEGA1 arranged to determine pre-equalization coefficients from a combination of transfer functions or impulse responses stored in the memory $MEM1_2$.

Naturally, the memories $MEM1_1$ and $MEM1_2$ may be implemented in a single memory module, and the selective receiver SEL1 and the receiver REC1 may be implemented in a single radio signal receiver module. Similarly, the estimators ESTIM1_1 and ESTIM1_2 may be implemented by a single estimator module.

The destination communicating entity EC2 comprises:

a pilot sequence generator PILOT2_1 arranged to transmit a first pilot sequence from any one of the destination antennas $A2_j$, for j varying from 1 to M2 at a carrier frequency f2 of the frequency band dedicated to transmission from the communicating entity EC2 to the communicating entity EC1;

a channel estimator ESTIM2 arranged to estimate an impulse response on the basis of receiving via a destination antenna of the set of destination antennas a second pilot sequence transmitted by a transmit antenna of the originating communicating entity; and a pilot sequence generator PILOT2_2 arranged to transmit from a destination antenna a third pilot sequence modulated by the impulse response estimated by the channel estimator ESTIM2. The modulated pilot sequence is transmitted on a carrier frequency of the frequency band dedicated to transmission from the communicating entity EC2 to the communicating entity EC1.

Naturally, the pilot sequence generators PILOT2_1 and PILOT2_2 may be implemented by a single pilot sequence generator module.

The various means of the originating and destination communicating entities may be implemented by analog or digital techniques that are well known to the person skilled in the art.

Figure 2:
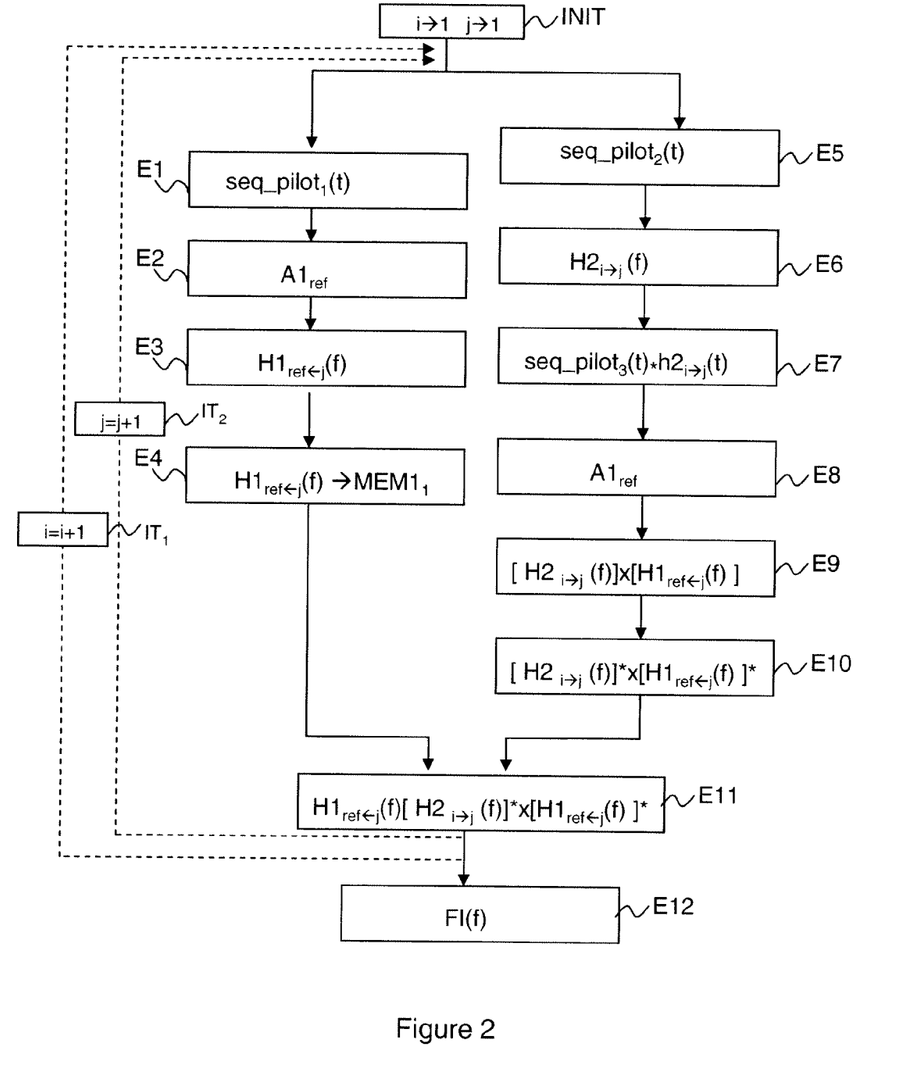
FIG. 2 shows the steps of the method of pre-equalizing a data signal in a first particular implementation.

With reference to FIG. 2, the method of an embodiment of the invention of pre-equalizing a data signal comprises steps E1 to E12. In this example, the results of the steps are described in the frequency domain, but they are directly transposable into the time domain, given the following definitions.

An impulse response is defined by a function ri(t), which is a function of time t, and it has its transfer function given by RI(f), which is a function of frequency f. The convolution product of impulse responses corresponds to the product of the corresponding transfer functions. The time-reversed impulse response ri(t) is written ri(−t), and the corresponding transfer function is RI(f)*, which is the conjugate of the transfer function RI(f).

Steps E1 to E11 are reiterated for at least a portion of the set of destination antennas and for at least a portion of the originating antennas. The iterations are symbolized by an initialization step INIT, a step $IT_1$ of incrementing the index i of the originating antennas $A1_i$ and of step $IT_2$ of iterating the index j of the destination antennas $A2_j$. An iteration of the steps E1 to E11 is thus described for an originating antenna $A1_j$ and for a destination antenna $A2_j$.

In step E1, the pilot sequence generator PILOT2_1 of the destination communicating entity generates a first pilot sequence $seq\_pilot_1(t)$. This first pilot sequence is transmitted by the antenna $A2_j$ on a carrier frequency f2 of the frequency band dedicated to transmission from the communicating entity EC2 to the communicating entity EC1 in accordance with the basic principles of carrier frequency transmission in FDD mode.

In the following step E2, the selective receiver SEL1 of the originating communicating entity receives from the set of originating antennas the first pilot sequence transmitted by the communicating entity EC2. The selective receiver SEL1 also selects a reference antenna from the set of pilot signals received from the set of originating antennas. By way of example, it performs this selection by comparing the energies received on the various originating antennas and it selects the antenna on which the pilot signal presents the maximum energy. In a second example, the selective receiver selects the antenna on which the pilot signal is spread the least in time. In another example, the selective receiver may also select a reference antenna in random manner.

In step E3, the channel estimator ESTIM1_1 acts on the pilot signal received on the reference antenna to estimate a first impulse response $h1_{ref \leftarrow j}(t)$, or in equivalent manner a third transfer function $H1_{ref \leftarrow j}(f)$, representative of the first propagation channel C1(ref←j) between the destination antenna $A2_j$ and the reference antenna $A1_{ref}$. Channel estimation is performed on the basis of knowledge of the first pilot sequence transmitted by the destination antenna $A2_j$ using any channel estimation method well known to the person skilled in the art, e.g. using one of the methods described in the work entitled "Digital communications" by John G. Proakis and Masoud Saheli, published in November 2007 by McGraw-Hill.

In the following step E4, the memory $MEM1_i$ stores the first impulse response $h1_{ref \leftarrow j}(t)$, or in equivalent manner the first transfer function $H1_{ref \leftarrow j}(f)$, as estimated during step E3.

In parallel with step E1, the pilot sequence generator PILOT1 of the originating communicating entity generates a second pilot sequence $seq\_pilot_2(t)$ during a step E5. This second pilot sequence is transmitted by the originating antenna $A1_i$ on a carrier frequency f1 in the frequency band dedicated to transmission from the communicating entity EC1 to the communicating entity EC2 in accordance with the basic principles of carrier frequency transmission in FDD mode.

In step E6, following step E5, the channel estimator ESTIM2 acts on the basis of the second pilot sequence as transmitted by the originating antenna $A1_i$ and as received by the destination antenna $A2_j$ to estimate a second impulse response $h2_{i \rightarrow j}(t)$, or in equivalent manner a second transfer function $H2_{i \rightarrow j}(f)$. This second transfer function is representative of the second propagation channel C2(i→j) between the originating antenna $A1_i$ and the destination antenna $A2_j$. Estimation is performed on the basis of knowledge of the second pilot sequence transmitted by the originating antenna $A1_i$ using any channel estimation method well known to the person skilled in the art, e.g. as mentioned above.

In the following step E7, the pilot sequence generator PILOT2_2 of the destination entity generates a third pilot sequence $seq\_pilot_3(t)$. This third pilot sequence is transmitted by the antenna $A2_j$ after being pre-distorted by the second impulse response $h2_{i \rightarrow j}(t)$ as determined during step E6. The modulated third pilot sequence is written as follows:

$$seq\_pilot_3(t) * h2_{i \rightarrow j}(t)$$

This modulated third sequence is transmitted by the destination antenna $A2_j$ on a carrier frequency f2 of the frequency band dedicated to transmission from the communicating entity EC2 to the communicating entity EC1 in accordance with the basic principles of carrier frequency transmission in FDD mode.

In step E8, the receiver REC1 of the originating communicating entity EC1 receives on the set of originating antennas the modulated third pilot sequence as transmitted by the destination antenna $A2_j$. The receiver REC1 selects the pilot signal received by the reference antenna $A1_{ref}$.

In step E9, the channel estimator ESTIM1_2 of the originating communicating entity acts on the basis of the pilot signal received by the reference antenna to estimate an impulse response $ri_{comb}(t)$, said to be the "combined" impulse response, or in equivalent manner a transfer function $RI_{comb}(f)$. Estimation is performed on the basis of knowledge of the third pilot sequence and using any channel estimation method well known to the person skilled in the art, e.g. as mentioned above. The transfer function $RI_{comb}(f)$ is representative of the succession of the second and first propagation channels and is given by:

$$RI_{comb}(f) = H2_{i \rightarrow 1}(f) \times H1_{ref \leftarrow j}(f)$$

with $H1_{ref \leftarrow 4}(f)$ being the transfer function of the first propagation channel $C1(A1_{ref} \leftarrow A2_j)$ and $H2_{i \rightarrow j}(f)$ being the transfer function of the second propagation channel $C2(A1_i \rightarrow A2_j)$.

In step E10, the impulse analyzer RTEMP1 time reverses the combined impulse response $ri_{comb}(t)$. For this purpose, the impulse analyzer stores the combined impulse response, e.g. storing the coefficients of the combined impulse response, and classifies the conjugates thereof in the order opposite to the order of the coefficients of $ri_{comb}(t)$. The transfer function of the time-reversed combined impulse response $ri_{comb}(-t)$ is thus given by:

$$RI_{comb}(f)^* = [H2_{i \rightarrow i}(f)]^* \times [H1_{ref \leftarrow j}(f)]^*$$

In another example, the impulse analyzer analyzes the impulse response $ri_{comb}(t)$ by means of an analog separator and it deduces therefrom a discrete model of the combined impulse response. The analyzer then performs time reversal on the basis of the discrete model.

In the following step E11, the calculator COMB1 combines the impulse response $ri_{comb}(-t)$ and the impulse response $h1_{ref \leftarrow j}(t)$ as stored during step E4 in the memory $MEM1_1$ of the originating communicating entity. The combination is performed by obtaining the convolution product of the above-mentioned impulse response, or in equivalent manner the product of the corresponding transfer function. The transfer function $H_{ij}(f)$ of the resulting impulse response $r_{ij}(t)$ is given by:

$$H_{ij}(f) = H1_{ref \leftarrow j}(f) \times [H2_{i \rightarrow j}(f)]^* \times [H1_{ref \leftarrow j}(f)]^*$$

The impulse response $r_{ij}(t)$, referred to as the "composite" impulse response, is then stored in the memory $MEM1_2$ of the originating communicating entity.

The succession of steps E1 to E4 and the succession of steps E5 to E10 may be carried out in parallel. The method thus requires only simple co-operation between the communicating entities. Nevertheless, step E11 is activated only after steps E2 to E4 have taken place following the transmission of a pulse by the communicating entity EC2 and after the steps E5 to E10 have taken place following the transmission of a first pilot sequence by the destination communicating entity EC2. Synchronizing the communicating entities then makes it possible to optimize activation of step E11, e.g. by performing the steps E1 and E5 simultaneously.

The steps E1 to E11 are reiterated for a portion of the originating antennas and a portion of the destination antennas, with the memory $MEM1_2$ of the originating communicating entity including a stored set of composite transfer functions or of composite impulse responses. For iterations performed on M1 destination antennas and M2 originating antennas, the memory $MEM1_2$ has M1×M2 composite transfer functions $H_{ij}(f)$ for i varying from 1 to M1 and j varying from 1 to M2.

In step E12, the pre-equalizer PEGA1 of the originating communicating entity determines pre-equalization coefficients for a data signal S(t) having M1 antenna signals $[S_1(t), \ldots S_i(t), \ldots, S_{M1}(t)]$ from a combination of composite transfer functions $H_{ij}(f)$ in order to form a set FI of M1 pre-equalization filters $FI_i(f)$, for i varying from 1 to M1. The antenna signal $S_i(t)$ transmitted via the antenna $A1_i$ is thus shaped by applying the corresponding filter $FI_i(f)$ given by:

$$FI_i(f) = \sum_{j=1}^{M2} C_j H_{ij}(f)$$

The weighting coefficients $C_j$ for j varying from 1 to M2 are configurable parameters. They are determined as a function of the method used for generating a data signal. By way of example, these parameters are updated whenever the destination antenna is switched off or on, or as a function of variation in the state of the propagation channels over time.

After step E12, the data signal is thus pre-equalized by filtering each of the antenna signals with the corresponding filter from the set FI and transmitted by the communicating entity EC1 to the communicating entity EC2.

In a particular implementation, steps E1 to E11 are performed only for a single originating antenna $A1_i$ in the set of originating antennas. This implementation corresponds to the situation in which the data signal that is to be equalized is the antenna signal $S_i(t)$. The memory $MEM1_2$ of the originating communicating entity has M2 composite transfer functions $H_{ij}(f)$ for j varying from 1 to M2. The pre-equalizer PEGA1 determines a single pre-equalization filter $FI_i(f)$. The antenna signal $S_i(t)$ transmitted via the antenna $A1_i$ is thus shaped by applying the corresponding filter $FI_i(f)$ given by:

$$FI_i(f) = \sum_{j=1}^{M2} C_j H_{ij}(f)$$

In a particular implementation, the set of destination antennas has only one destination antenna $A2_1$. The steps E1 to E11 are implemented only for transmission of a single first pilot sequence via the antenna $A2_1$ of the destination communicating entity.

As an illustrative example in which the steps E1 to E11 are re-iterated for all of the originating antennas, the pre-equalizer in step E12 determines the pre-equalization coefficients as a function of M1 composite transfer functions $H_{i1}(f)$ for i varying from 1 to M1. The set FI of M1 pre-equalization filters $FI_i(f)$ for application to the data signal is given by:

$$FI = [FI_1(f), \ldots, FI_i(f), \ldots, FI_{M1}(f)]$$

with:

$$FI_i(f) = H_{i1}(f)$$

In a particular implementation, the set of originating antennas has only one originating antenna $A1_1$. The data signal then comprises only one antenna signal $S_1(t)$ transmitted by the single originating antenna, and the reference antenna is the originating antenna $A1_1$. The steps E1 to E11 are implemented only for transmitting a single second pilot sequence and a single modulated third pilot sequence via the single antenna $A1_1$ of the originating communicating entity.

As an illustrative example in which the steps E1 to E11 are re-iterated for all of the destination antennas, in step E12, M2 composite transfer functions $H_{1j}$ are available for j varying from 1 to M2. The pre-equalizer determines a single pre-equalization filter $FI_1(f)$ that is applied to the data signal from the M2 coefficients $C_j$, such that:

$$FI_1(f) = \sum_{j=1}^{M2} C_j H_{1j}(f)$$

In a particular implementation, the set of originating antennas has only one originating antenna $A1_1$ and the set of destination antennas has only one destination antenna $A2_1$. The data signal then comprises a single antenna signal $S_1(t)$ and the reference antenna of the originating entity is the antenna $A1_1$. The steps E1 to E11 are implemented only for transmitting a single first pilot sequence via the destination antenna $A2_1$ and transmitting a single second pilot sequence and a single modulated third pilot sequence via the originating antenna $A1_1$. In step E12, the composite transfer $H_{11}(f)$ determines a single pre-equalization filter $FI_1(f)$ given by:

$$FI_1(f) = H_{11}(f)$$

Figure 3:
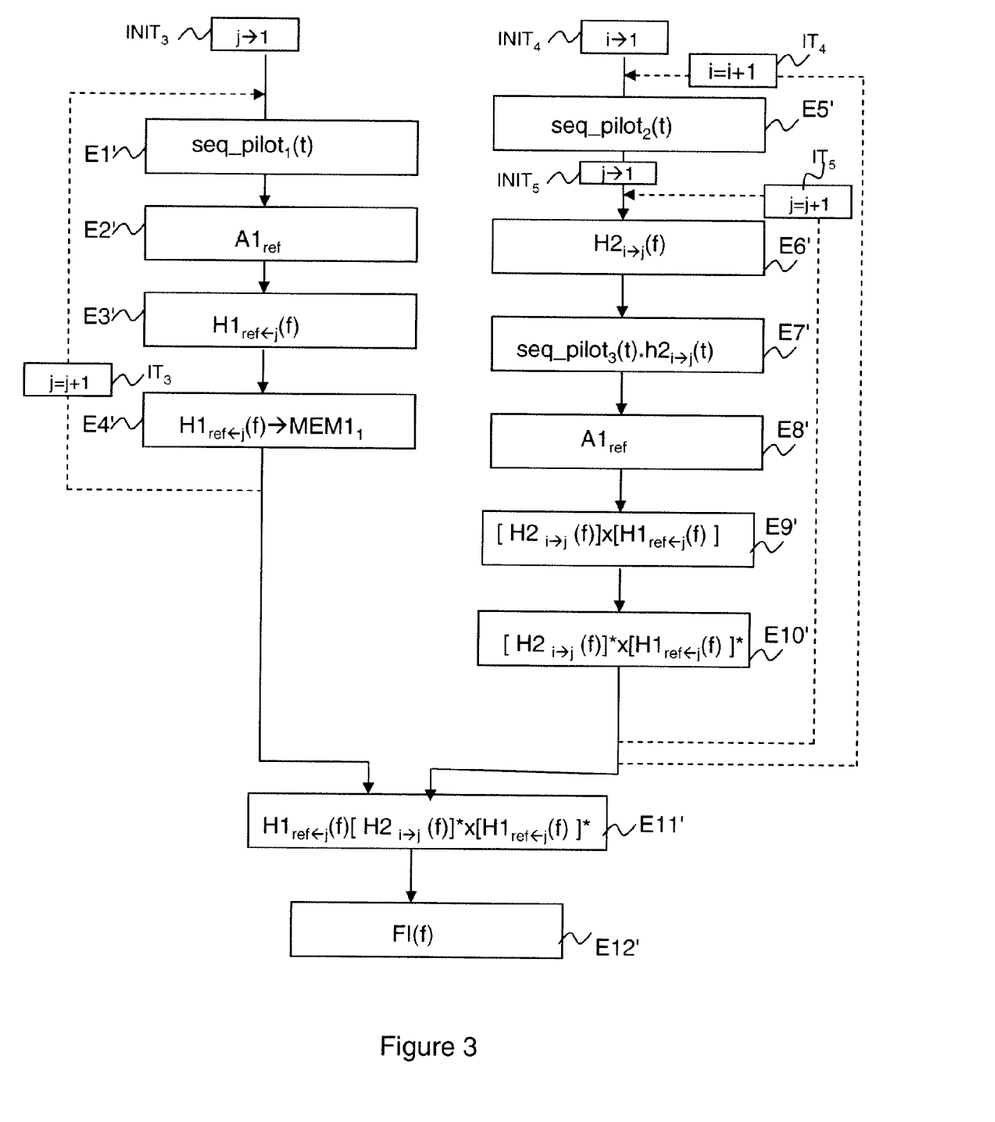
FIG. 3 shows the method of pre-equalizing a data signal in a second particular implementation.

FIG. 3 shows the steps of the method of pre-equalizing a data signal in a second particular implementation. The method comprises steps E1' to E12' similar to above-described steps E1 to E12 for which the iteration loops on the originating and destination antennas are modified.

Steps E1' to E4' are re-iterated for at least a portion of the set of destination antennas. The iterations are symbolized by an initialization step $INIT_3$ and a step $IT_3$ of incrementing the index j of the destination antennas $A2_j$.

An iteration of steps E1' to E4' corresponding to a destination antenna $A2_j$ thus comprises:

during step E1', transmitting via the destination antenna $A2_j$ a first pilot sequence $seq\_pilot_1(t)$;

during step E2', the selective receiver SEL1 receiving the first pilot sequence transmitted by the destination antenna $A2_j$, and selecting the reference antenna $A1_{ref}$;

during step E3', estimating the first impulse response $h1_{ref \leftarrow j}(t)$ for the first propagation channel $C1(ref \leftarrow j)$ between the destination antenna $A2_j$ and the reference antenna $A1_{ref}$; and during step E4', storing in the memory $MEM1_1$ the estimated first impulse response $h1_{ref \leftarrow j}(t)$ or the corresponding transfer function.

The steps E1' to E4' are re-iterated for at least a portion of the set of destination antennas, with the memory $MEM1_1$ of the originating communicating entity then including the set of transfer functions as obtained successively during the iterations.

In parallel with the iterations of steps E1' to E4', the sequence generator PILOT1 of the originating communicating entity acts during step E5' to generate a second pilot sequence $seq\_pilot_2(t)$. This second pilot sequence is transmitted iteratively via each antenna of a portion of the set of originating antennas. The iterations are symbolized by an initialization step $INIT_4$ and a step $IT_4$ of incrementing the index i of the originating antennas $A1_i$.

For an iteration corresponding to the second pilot sequence $seq\_pilot_2(t)$ being transmitted via the originating antenna $A1_i$, the steps E6' to E10' are re-iterated for a portion of the destination antennas.

The iteration of steps E6' to E10' is symbolized by an initialization step $INIT_5$ and a step $IT_5$ of incrementing the index j of the destination antennas $A2_j$.

An iteration of steps E6' to E10' for a destination antenna $A2_j$ thus comprises:

during the step E6', the channel estimator ESTIM1_2 of the destination communicating entity using the second pilot sequence transmitted via the originating antenna $A1_i$ and received via the antenna $A2_j$ to estimate a second impulse response $h2_{i \rightarrow j}(t)$. The impulse response $H2_{i \rightarrow j}(t)$ is representative of the second propagation channel $C2(i \rightarrow j)$ between the destination antenna $A1_i$ and the destination antenna $A2_j$;

during the step E7', the pilot sequence generator PILOT2_2 of the destination entity generates a third pilot sequence $seq\_pilot_3(t)$. This third pilot sequence is transmitted via the destination antenna $A2_j$ after being pre-distorted by the impulse response $h2_{i \rightarrow j}(t)$ as determined during step E6';

during step E8', the receiver REC1 of the originating communicating entity EC1 receives over the set of originating antennas the modulated third pilot sequence as transmitted by the destination antenna $A2_j$. The receiver REC1 selects the pilot signal as received by the reference antenna $A1_{ref}$;

during step E9', the channel estimator ESTIM1_2 of the originating communicating entity uses the pilot signal received by the reference antenna to estimate a so-called "combined" impulse response $ri_{comb}(t)$, or in equivalent manner a transfer function $RI_{comb}(f)$ given by:

$$RI_{comb}(f) = H2_{i \rightarrow j}(f) \times H1_{ref \leftarrow j}(f)$$

during step E10', the impulse analyzer RTEMP1 performs time reversal of the combined impulse response.

For an iteration of the steps E6' to E10' performed by the destination antenna $A2_j$, the time-reversed combined impulse response is stored in the memory $MEM1_2$ of the originating communicating entity.

Steps E6' to E10' are re-iterated for at least a portion of the set of originating antennas, so the memory $MEM1_2$ includes, for the destination antenna $A2_j$, the set of combined impulse responses as obtained in succession during the iterations on the index i.

After the iterations over a portion of the set of destination antennas, the memory $MEM1_2$ of the originating communicating entity includes the following set of transfer functions:

$$[H2_{i \rightarrow j}(f)]^* \times [H1_{ref \leftarrow j}(f)]^*$$

The succession of steps E1' to E4' and the succession of steps E5' to E10' may be performed in parallel. Nevertheless, a first iteration of the step E8' for an antenna A1$_i$ can be implemented only after a reference antenna has been selected during the first iteration of step E2'. Thus, this implementation serves to optimize the number of exchanges between the communicating entities, while nevertheless adding constraints concerning synchronization of the steps between the two communicating entities.

During the step E11', the calculator COMB1 of the originating communicating entity combines the first impulse responses stored in the memory MEM1$_1$ and the time-reversed combined impulse responses stored in the memory MEM1$_2$.

For an originating antenna index i for i varying from 1 to M1, and a destination antenna index j for j varying from 1 to M2, the calculator COMB1 thus determines the transfer function H$_{ij}$(f), referred to as the "composite" transfer function, given by:

$$H_{ij}(f) = H1_{ref \leftarrow j}(f) \times [H2_{i \rightarrow j}(f)]^* \times [H1_{ref \leftarrow j}(f)]^*$$

For iterations performed on the set of originating antennas and the set of destination antennas, the calculator COMB1 of the originating communicating entity performs M1×M2 combinations of the first impulse responses stored in the memory MEM1$_1$ and the time-reversed combined impulse responses stored in the memory MEM1$_2$.

In step E12', the pre-equalizer PEGA1 of the originating communicating entity determines pre-equalization coefficients for a data signal S(t) comprising M1 antenna signals [S$_1$(t), . . . S$_i$(t), . . . , S$_{M1}$(t)] from a combination of the composite transfer functions H$_{ij}$(f) in order to form a set FI of M1 pre-equalization filters FI$_i$(f), for i varying from 1 to M1, for iteration loops performed for all of the destination antennas. The antenna signal S$_i$(t) transmitted via the antenna A1$_i$ is thus shaped by applying a corresponding filter FI$_i$(f) given by:

$$FI_i(f) = \sum_{j=1}^{M2} C_j H_{ij}(f)$$

The data signal is thus pre-equalized by filtering each of the antenna signals by the corresponding filter in the set FI and transmitted by the communicating entity EC1 to the communicating entity EC2.

In a particular implementation, the step E1' and the iterative loop on the steps E6' to E10' are performed for only a single originating antenna A1$_i$ of the set of originating antennas. This implementation corresponds to the situation in which the data signal that is to be equalized is the antenna signal S$_i$(t). The memory MEM1$_2$ of the originating communicating entity has M2 composite transfer functions H$_{ij}$(f) for j varying from 1 to M2. The pre-equalizer PEGA1 determines a single pre-equalization filter FI$_i$(f). The antenna signal S$_i$(t) transmitted via the antenna A1$_i$ is thus shaped by applying the corresponding filter FI$_i$(f), given by:

$$FI_i(f) = \sum_{j=1}^{M2} C_j H_{ij}(f)$$

The method may also be implemented for bidirectional transmission. In this particular implementation, the method is implemented in the up direction and in the down direction using the first or second implementation corresponding to FIG. 2 or FIG. 3 so that the transmission of a pilot sequence and an antenna signal by a communicating entity are not performed simultaneously in order to be able to estimate the propagation channel.

In the various implementations described and corresponding to FIG. 2 or 3, the iteration loops are performed over a portion of the destination antennas and a portion of the originating antennas. The number of antennas and which antennas are selected are configurable parameters of the method. They may be determined for example as a function of the characteristics of the antenna.

Furthermore, the first and/or second and/or third pilot sequences may be selected to be identical.

An embodiment of the invention described here relates to a device for pre-equalizing a data signal for use in an originating communicating entity. Consequently, an embodiment of the invention also applies to a computer program, in particular a computer program on or in a data recording medium, and suitable for implementing an embodiment of the invention. The program may use any programming language, and it may be in the form of source code, object code, or code intermediate between source code and object code such as in a partially compiled form, or in any other desirable form for implementing those of the steps of the method of an embodiment of the invention that are performed in the originating communicating entity.

An embodiment of the invention described herein also relates to a device for pre-equalizing a data signal for use in a destination communicating entity. Consequently, an embodiment of the invention also applies to a computer program, in particular a computer program on or in a data recording medium, and suitable for implementing an embodiment of the invention. The program may use any programming language, and it may be in the form of source code, object code, or code intermediate between source code and object code, such as in a partially compiled form, or in any other desirable form for implementing those of the steps of the method of an embodiment of the invention that are performed in the destination communicating entity.

Although the present disclosure has been described with reference to one or more examples, workers skilled in the art will recognize that changes may be made in form and detail without departing from the scope of the disclosure and/or the appended claims.

The invention claimed is:

1. A method of pre-equalizing a data signal transmitted in frequency division duplex by an originating communicating entity having a set of originating antennas to a destination communicating entity having a set of destination antennas, the method comprising the steps of:

receiving via a reference antenna of the set of originating antennas a first pilot sequence transmitted by a destination antenna through a first propagation channel, and estimating a first impulse response representative of said first propagation channel;

receiving via the destination antenna a second pilot sequence transmitted by an originating antenna through a second propagation channel between said originating antenna and the destination antenna, and estimating a second impulse response representative of said second propagation channel;

receiving, via the reference antenna, a third pilot sequence that is modulated by said second impulse response and transmitted by the destination antenna, and estimating a combined impulse response representative of said first and second propagation channels in succession;

time reversing the combined impulse response; and combining the time-reversed combined impulse response and the first impulse response;

said steps being re-iterated for at least a portion of the set of destination antennas and at least a portion of the set of originating antennas; and determining pre-equalization coefficients for the data signal from a set of said impulse response combinations.

2. The method according to claim 1, wherein the step of receiving the first pilot sequence transmitted by the destination antenna includes selecting the reference antenna as a function of a set of pilot signals received by the set of originating antennas.

3. The method according to claim 2, wherein the reference antenna is selected as a function of the energies of the pilot signals in the set of pilot signals received via the set of originating antennas.

4. A device for pre-equalizing a data signal transmitted in frequency division duplex for a communicating entity referred to as an originating communicating entity having a set of originating antennas, said originating communicating entity being suitable for transmitting said signal to a destination communicating entity having a set of destination antennas, said device comprising:

means for receiving via a reference antenna of the set of originating antennas, a first pilot signal transmitted by a destination antenna through a first propagation channel, and estimating a first impulse response representative of said first propagation channel;

means for transmitting via an originating antenna, a second pilot sequence through a second propagation channel between said originating antenna and the destination antenna;

means for receiving via the reference antenna, a modulated third pilot sequence, and estimating a combined impulse response representative of said first and second propagation channels in succession;

means for time reversing the combined impulse response;

means for combining the combined and time-reverse impulse response with the first impulse response; and means for determining pre-equalization coefficients for the data signal from a set of impulse response combinations;

the means for receiving, the means for time reversing, and the means for combining being implemented iteratively for at least a portion of the set of destination antennas and at least a portion of the set of originating antennas.

5. A communicating entity of a radio communications system including at least one device according to claim 4.

6. A device for pre-equalizing a data signal transmitted in frequency division duplex for a communicating entity referred to as a destination communicating entity, and having a set of destination antennas, said destination communicating entity being suitable for receiving said data signal transmitted by an originating communicating entity, said originating communicating entity having a set of originating antennas, said device comprising:

means for transmitting a first pilot sequence via a destination antenna to the originating communicating entity;

means for receiving a second pilot sequence transmitted by an originating antenna, and estimating an impulse response; and means for transmitting a third pilot sequence modulated by said estimated impulse response;

the means for transmitting and the means for receiving being implemented iteratively for at least a portion of the set of destination antennas and at least a portion of the set of originating antennas.

7. A communicating entity of a radio communications system including at least one device according to claim 6.

8. A radio communications system comprising:

at least one originating communicating entity comprising a set of originating antennas and a first device for pre-equalizing a data signal transmitted in frequency division duplex to a destination communicating entity having a set of destination antennas, said first device comprising:

means for receiving via a reference antenna of the set of originating antennas, a first pilot signal transmitted by a destination antenna through a first propagation channel, and estimating a first impulse response representative of said first propagation channel;

means for transmitting via an originating antenna, a second pilot sequence through a second propagation channel between said originating antenna and the destination antenna;

means for receiving via the reference antenna, a modulated third pilot sequence, and estimating a combined impulse response representative of said first and second propagation channels in succession;

means for time reversing the combined impulse response;

means for combining the combined and time-reverse impulse response with the first impulse response; and means for determining pre-equalization coefficients for the data signal from a set of impulse response combinations;

the means for receiving, the means for time reversing, and the means for combining being implemented iteratively for at least a portion of the set of destination antennas and at least a portion of the set of originating antennas; and at least one communicating entity referred to as the destination communicating entity and comprising a second device, said second device comprising:

means for transmitting the first pilot sequence via the destination antenna to the originating communicating entity;

means for receiving the second pilot sequence transmitted by the originating antenna, and estimating the impulse response; and means for transmitting the third pilot sequence modulated by said estimated impulse response;

the means for transmitting and the means for receiving of the second device being implemented iteratively for at least a portion of the set of destination antennas and at least a portion of the set of originating antennas.

9. A non-transitory data recording medium comprising a computer program recorded thereon, the program including software instructions for implementing a method of pre-equalizing a data signal transmitted in frequency division duplex by an originating communicating entity having a set of originating antennas to a destination communicating entity having a set of destination antennas when the program is executed by the originating communicating entity, wherein the method comprises the steps of:

receiving via a reference antenna of the set of originating antennas a first pilot sequence transmitted by a destination antenna through a first propagation channel, and estimating a first impulse response representative of said first propagation channel;

receiving via the destination antenna a second pilot sequence transmitted by an originating antenna through a second propagation channel between said originating antenna and the destination antenna, and estimating a second impulse response representative of said second propagation channel;

receiving, via the reference antenna, a third pilot sequence that is modulated by said second impulse response and transmitted by the destination antenna, and estimating a combined impulse response representative of said first and second propagation channels in succession;

time reversing the combined impulse response; and combining the time-reversed combined impulse response and the first impulse response;

said steps being re-iterated for at least a portion of the set of destination antennas and at least a portion of the set of originating antennas; and determining pre-equalization coefficients for the data signal from a set of said impulse response combinations.

10. A non-transitory data recording medium comprising a computer program recorded thereon, the program including software instructions for implementing a method of pre-equalizing a data signal transmitted in frequency division duplex for a destination communicating entity, and having a set of destination antennas, said destination communicating entity being suitable for receiving said data signal transmitted by an originating communicating entity, said originating communicating entity having a set of originating antennas, when the program is executed by the destination communicating entity, wherein the method comprises:

transmitting a first pilot sequence via a destination antenna to the originating communicating entity through a first propagation channel between an originating antenna and a destination antenna;

receiving a second pilot sequence transmitted by an originating antenna through a second propagation channel between said originating antenna and the destination antenna, and estimating an impulse response representative of said second propagation channel; and transmitting a third pilot sequence modulated by said estimated impulse response;

the steps of transmitting and receiving being implemented iteratively for at least a portion of the set of destination antennas and at least a portion of the set of originating antennas.

\* \* \* \* \*